US009434531B2

(12) United States Patent
Jehannet et al.

(10) Patent No.: US 9,434,531 B2
(45) Date of Patent: Sep. 6, 2016

(54) DEVICE AND ASSEMBLY FOR SUPPORTING A PAIR OF WINDSHIELD WIPERS, AND CORRESPONDING PACKAGING AND ASSEMBLY METHOD

(75) Inventors: Jean-Pierre Jehannet, Vernon (FR); Jocelyn Veret, Etrepagny (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 13/992,163

(22) PCT Filed: Sep. 26, 2011

(86) PCT No.: PCT/EP2011/066685
§ 371 (c)(1),
(2), (4) Date: Aug. 27, 2013

(87) PCT Pub. No.: WO2012/095194
PCT Pub. Date: Jul. 19, 2012

(65) Prior Publication Data
US 2013/0327665 A1 Dec. 12, 2013

(30) Foreign Application Priority Data
Dec. 8, 2010 (FR) .................................... 10 04791

(51) Int. Cl.
*B65D 85/00* (2006.01)
*B60S 1/38* (2006.01)

(52) U.S. Cl.
CPC ............... *B65D 85/54* (2013.01); *B60S 1/381* (2013.01); *B60S 1/3848* (2013.01); *B60S 2001/3843* (2013.01); *B65D 2585/6885* (2013.01); *Y10T 29/49826* (2015.01)

(58) Field of Classification Search
CPC .. B60S 1/0491; B60S 1/3801; B60S 1/3848; B65D 85/68; B65D 85/54; B65D 25/10; B65D 75/36; B65D 43/16; B65D 43/162; B65D 2585/6885
See application file for complete search history.

(56) References Cited

U.S. PATENT DOCUMENTS

| 5,660,280 | A | * | 8/1997 | Wiederhold et al. | .......... 206/549 |
| 5,899,334 | A | * | 5/1999 | Domerchie et al. | .......... 206/470 |
| 2009/0049638 | A1 | * | 2/2009 | Jehannet et al. | .......... 15/250.32 |

FOREIGN PATENT DOCUMENTS

| CN | 1638992 A | 7/2005 |
| CN | 101868382 A | 10/2010 |

(Continued)

OTHER PUBLICATIONS

International Search Report issued in PCT/EP2011/066685 mailed on Jun. 20, 2012 (8 pages).

(Continued)

*Primary Examiner* — Andrew Perreault
(74) *Attorney, Agent, or Firm* — Osha Liang LLP

(57) ABSTRACT

The present invention relates to a device for supporting a pair of windshield wipers (12, 26), each of which is provided with a structural element and a wiper blade (16, 30), the supporting device (10, 101, 102, 103, 104, 105, 200, 201) comprising a first and a second recess (14, 28), each of which is provided with means for retaining the respective structural elements of the two wipers (12, 26), characterized in that the recesses (14, 28) have an opening leading onto a single side of a supporting plane (P) in order to enable the insertion of the pair of wipers (12, 26) into the respective recesses (14, 28) from a single side of the supporting plane (P). The present invention also relates to a supporting assembly comprising a plurality of supporting devices, as well as to corresponding packaging and to a corresponding assembly method.

11 Claims, 7 Drawing Sheets

(56) References Cited

FOREIGN PATENT DOCUMENTS

Figure 1:
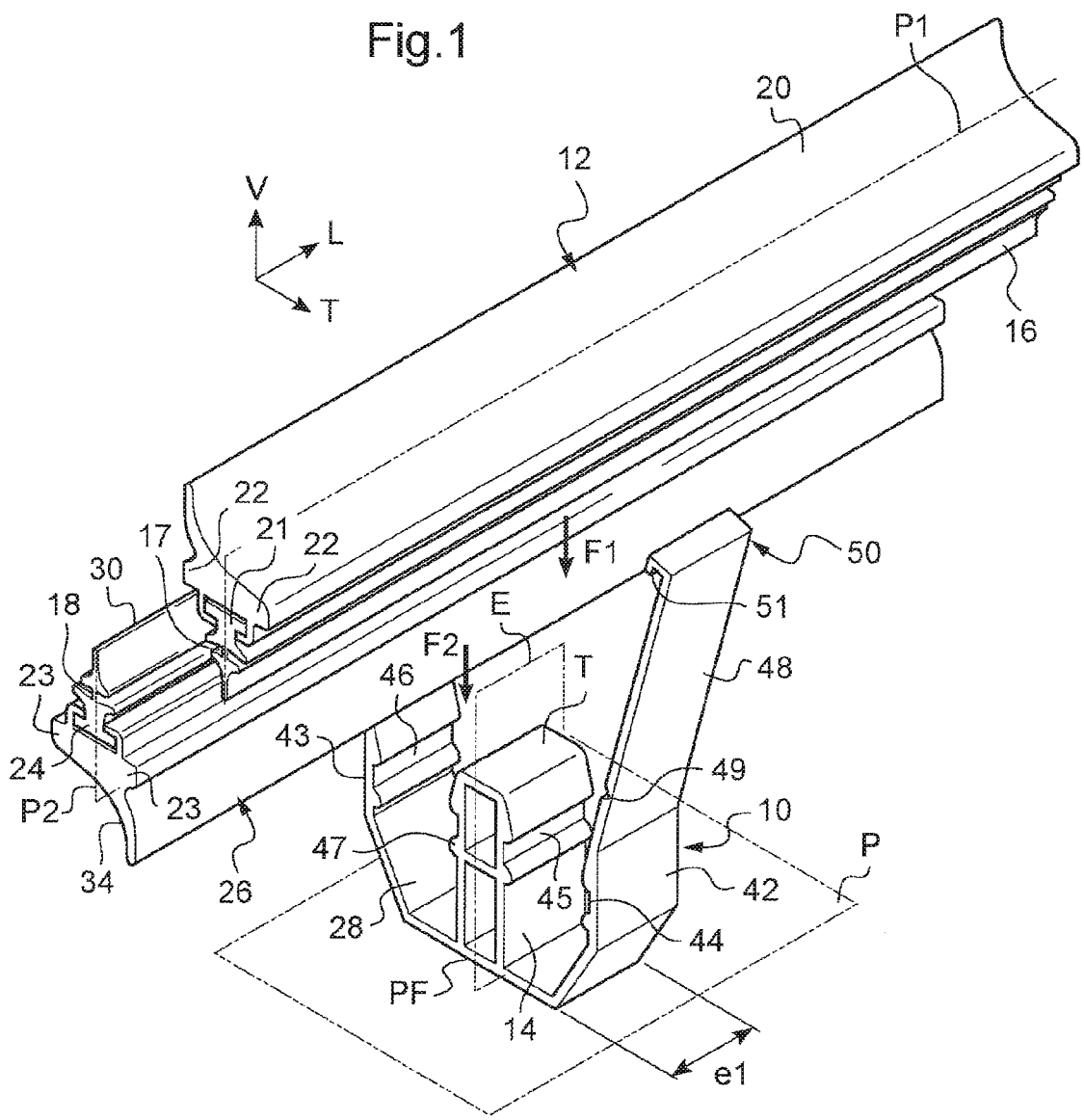

| DE | 10 2004 013508 A1 | | 10/2005 |
|---|---|---|---|
| FR | 2 900 133 A1 | | 10/2007 |
| FR | 2 936 783 A1 | | 4/2010 |
| WO | WO 2010022949 A1 | * | 3/2010 |

OTHER PUBLICATIONS

Office Action issued in corresponding Chinese Application No. 201180067099.1 dated Sep. 2, 2015, and English translation thereof (13 pages).

* cited by examiner

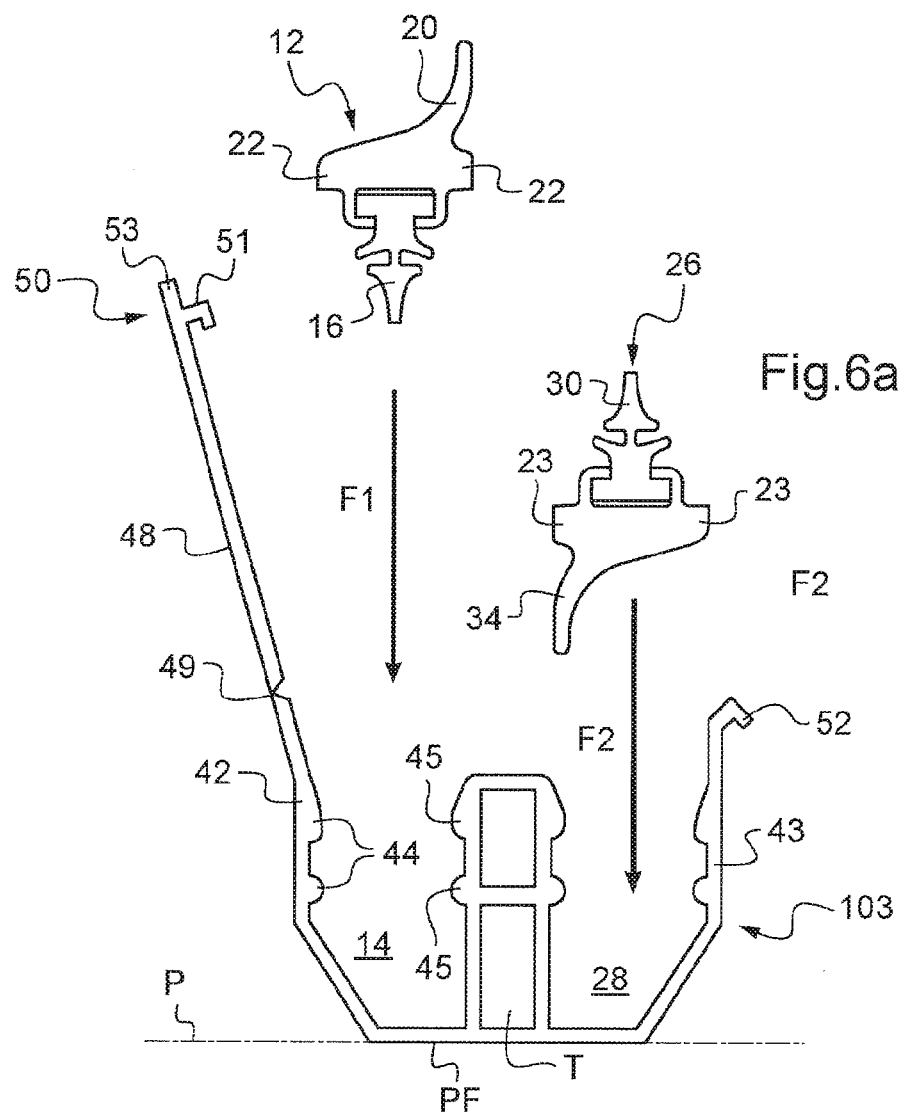
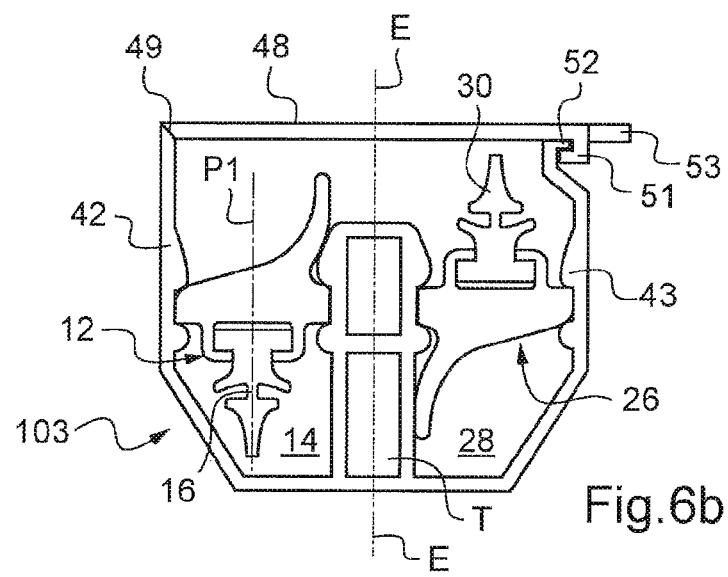

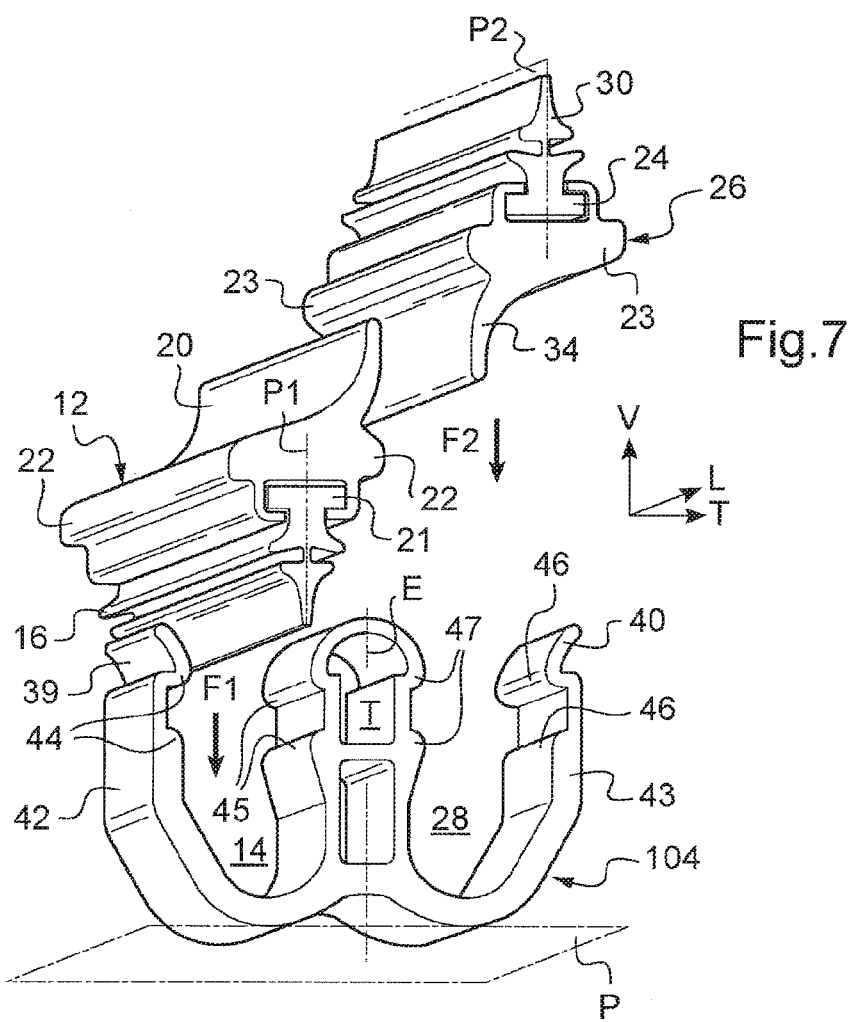
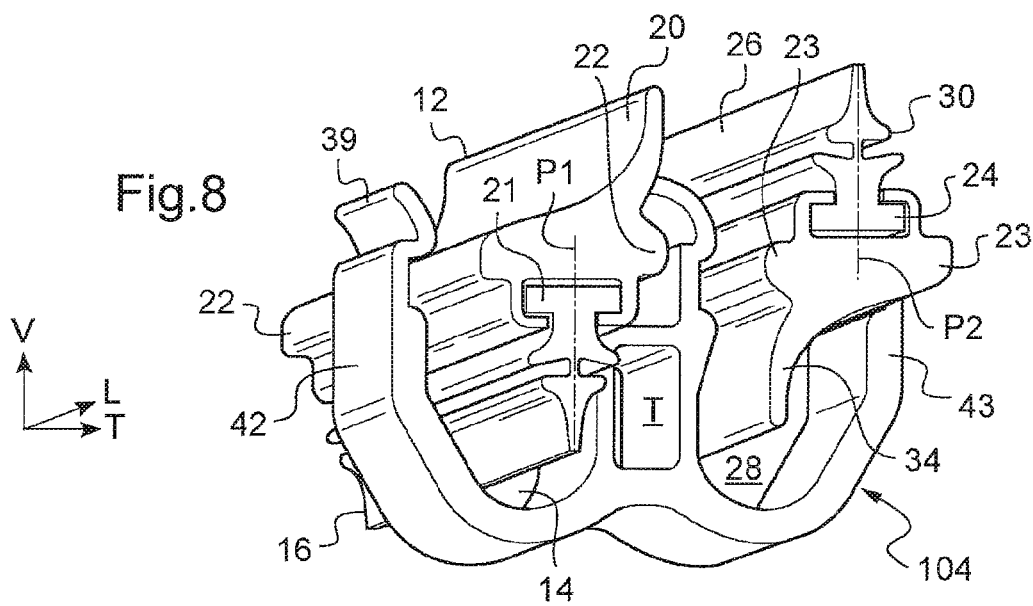

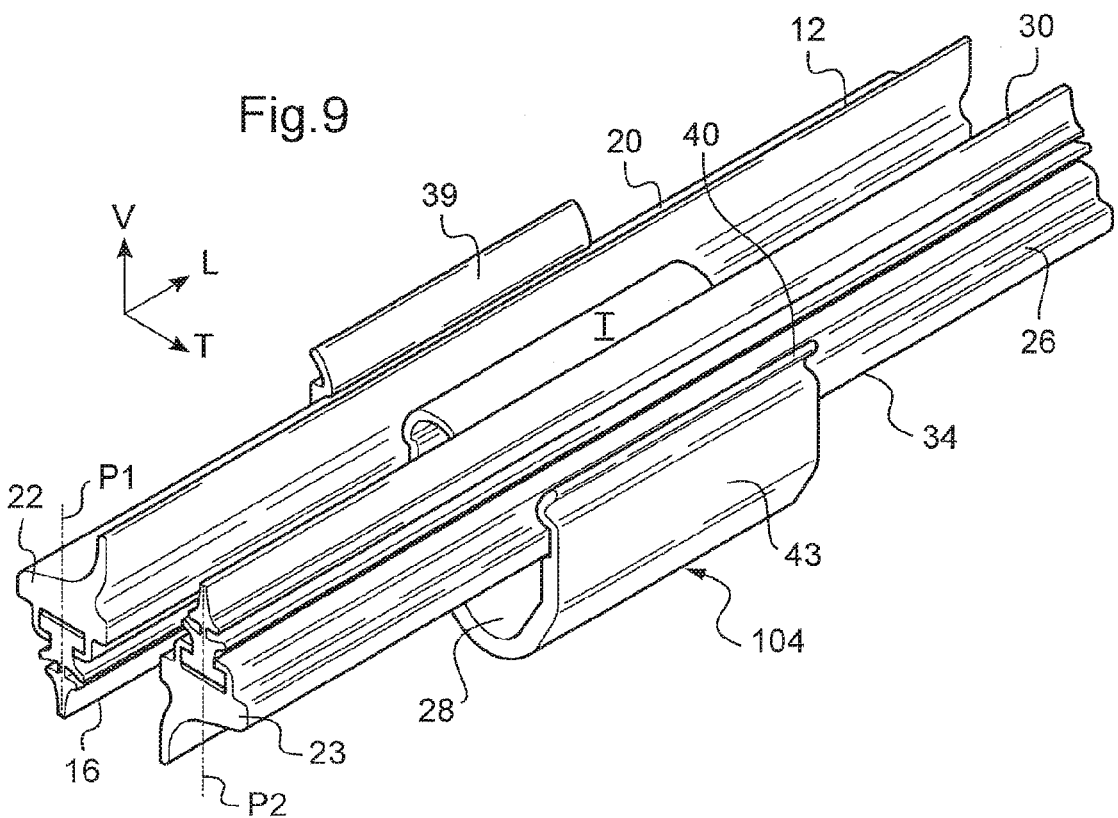
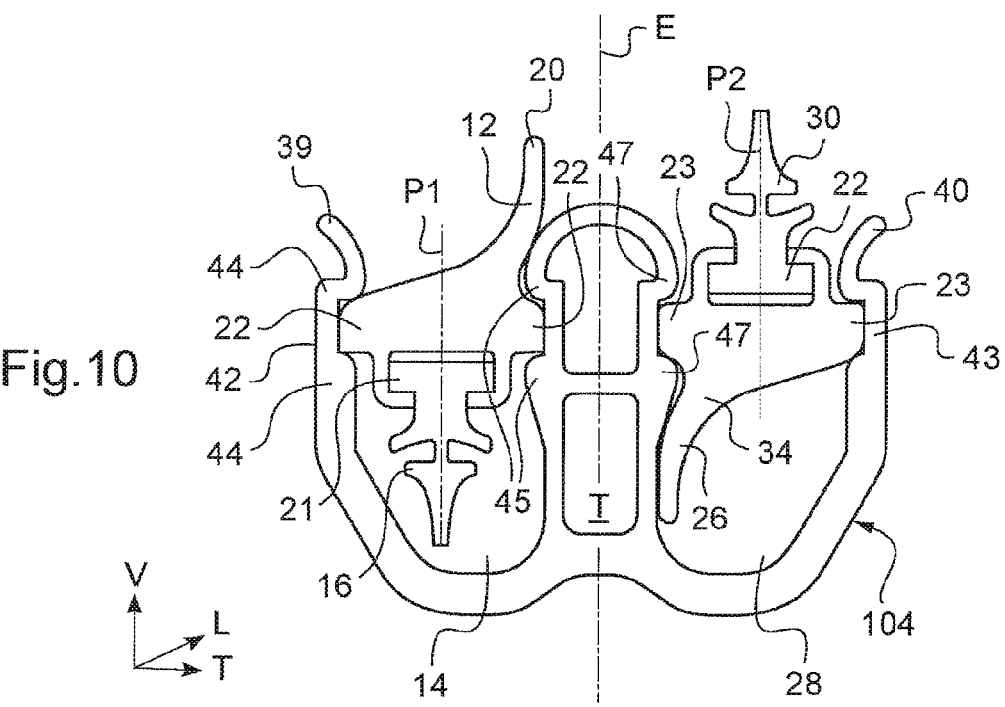

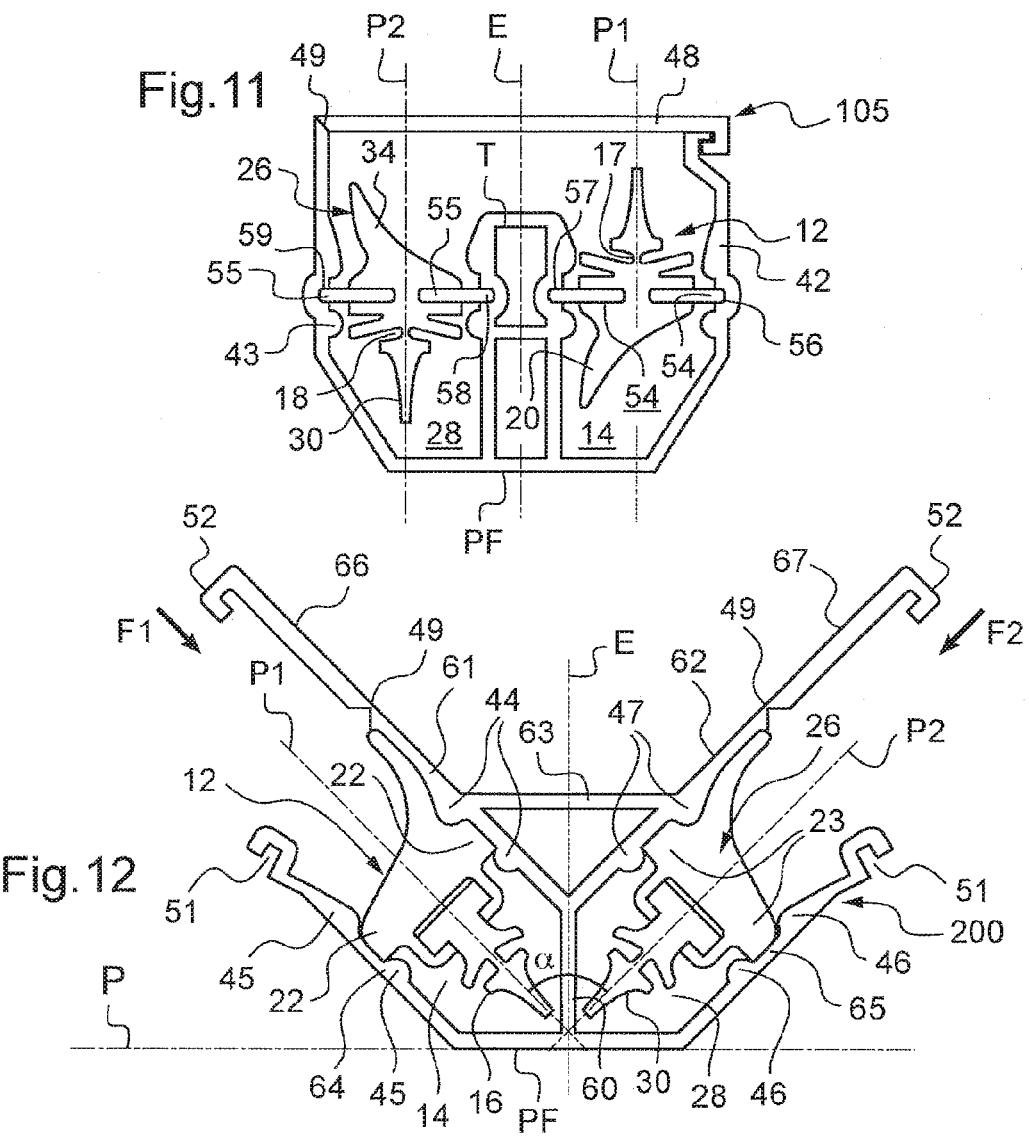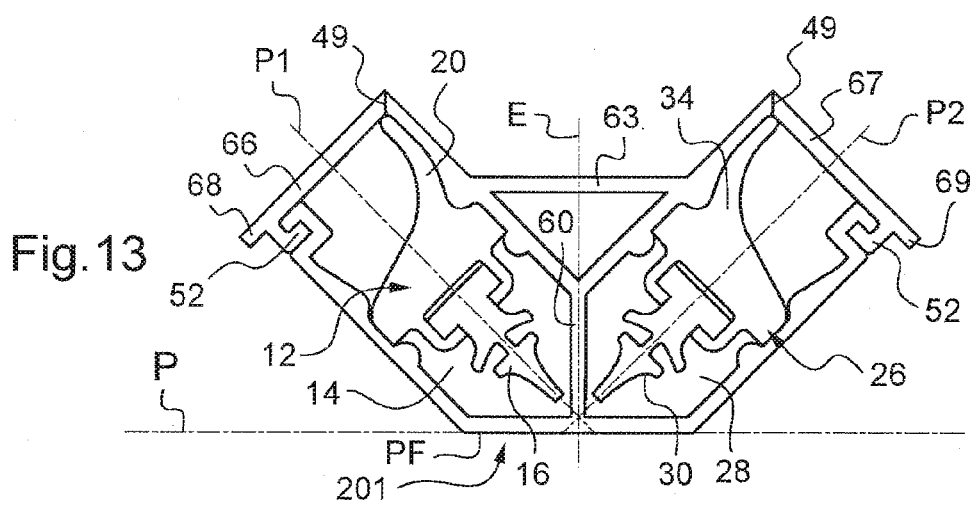

DEVICE AND ASSEMBLY FOR SUPPORTING A PAIR OF WINDSHIELD WIPERS, AND CORRESPONDING PACKAGING AND ASSEMBLY METHOD

The present invention relates to a device for supporting a pair of windshield wipers each including a structural element and a wiper blade a free edge of which is intended to be in contact with a glazed surface to be wiped. The invention also relates to a supporting assembly comprising a plurality of supporting devices, corresponding packaging and a corresponding assembly method.

The supporting device or assembly is for example intended to be used for the sale, in stores, of a kit for replacing a pair of windshield wipers of a vehicle, or for transporting a pair of windshield wipers from its place of manufacture to its place of packaging or to its place of mounting on an automobile vehicle.

One such device is described for example in published French patent application FR 2 900 133. To fix the windshield wipers in this device, which is in the form of a rail, a first wiper is positioned facing a first open channel of the device, its wiper blade being directed toward the interior of this channel. Pressure toward the bottom of the first channel is then applied in a direction normal to a median plane of the rail to fix the wiper by elastic nesting of its structural element in retaining means disposed in pairs at different locations of the first channel. The assembly consisting of the first wiper fixed to the supporting device is then turned over to fix a second windshield wiper into a second channel of the supporting device.

The invention proposes a solution for packaging a pair of windshield wipers enabling simplification of the assembly method.

To this end, the present invention consists in a device for supporting a pair of windshield wipers, each of which is provided with at least a structural element and a wiper blade, the supporting device including first and second recesses, each of which is provided with means for retaining the respective structural elements of the two wipers, characterized in that the recesses have an opening leading onto the same side of a supporting plane in order to enable insertion of the pair of wipers into the respective recesses from the same side of the supporting plane.

Thus the first and second wipers are mounted from the same side of the supporting device, which enables time to be saved. Indeed, the person carrying out the assembly operation saves one assembly step in the process of mounting the pair of wipers in the supporting device or devices compared to the prior art device which had to be turned over after fixing a first of the two wipers in order to fix the second wiper.

According to one or more of the features of the supporting device, taken individually or in combination:
the retaining means are of the elastic nesting type;
the retaining means of the elastic nesting type include first and second pairs of elastic bosses arranged longitudinally in the respective recess to clip a member of a structural element of the corresponding windshield wiper;
the retaining means of the elastic nesting type include first and second elastic grooves arranged longitudinally in the respective recess to clip a member of a structural element of the corresponding windshield wiper;
the retaining means of the elastic nesting type are associated with de-nesting means including a spreader lug for spreading the retaining means;
the supporting device has a bottom wall common to the first and second recesses, said common bottom wall being flat and parallel to the supporting plane;
the supporting device includes at least one closure cap for closing the first and second recesses, the closure cap being defined by a hinge provided in an extension of the wall of the recess and one edge of the closure cap including locking means adapted to interengage with complementary locking means on an edge of an extension of the wall of the recess;
the locking means interengage by elastic deformation;
the supporting device is generally m-shaped;
the supporting device has a plane of longitudinal symmetry between the first and second recesses and said recesses are arranged side-by-side so that in the nested position of the pair of wipers the respective planes of longitudinal symmetry of the wiper blades are substantially parallel to each other and parallel to the plane of longitudinal symmetry;
the supporting device is generally staple-shaped;
the supporting device includes a closure cap common to the first and second recesses;
the supporting device has a plane of longitudinal symmetry between the first and second recesses and said recesses are arranged side-by-side so that in the nested position of the pair of wipers the respective planes of longitudinal symmetry of the wiper blades form an angle $\alpha$ less than 180°;
the respective planes of longitudinal symmetry of the wiper blades form an angle $\alpha$ of the order of 90°.

The invention also consists in an assembly for supporting a pair of windshield wipers including a pair of windshield wipers each including at least a structural element and a wiper blade and a plurality of supporting devices as described hereinabove distributed along the length of the pair of windshield wipers.

The invention further consists in packaging for a pair of windshield wipers including a supporting device or assembly as described hereinabove.

The invention further consists in a method for mounting a pair of windshield wipers each including at least a structural element and a wiper blade in a supporting device or assembly as described hereinabove, characterized in that it includes the following steps:
fixing a first of the two wipers to the supporting device or assembly by insertion of the first wiper in a first insertion direction into a first recess,
fixing the second of the two wipers to the assembly comprising the first wiper and the supporting device or assembly by insertion of the second wiper in a second insertion direction from the same side of the supporting plane as the first insertion direction for the first wiper.

Figure 2:
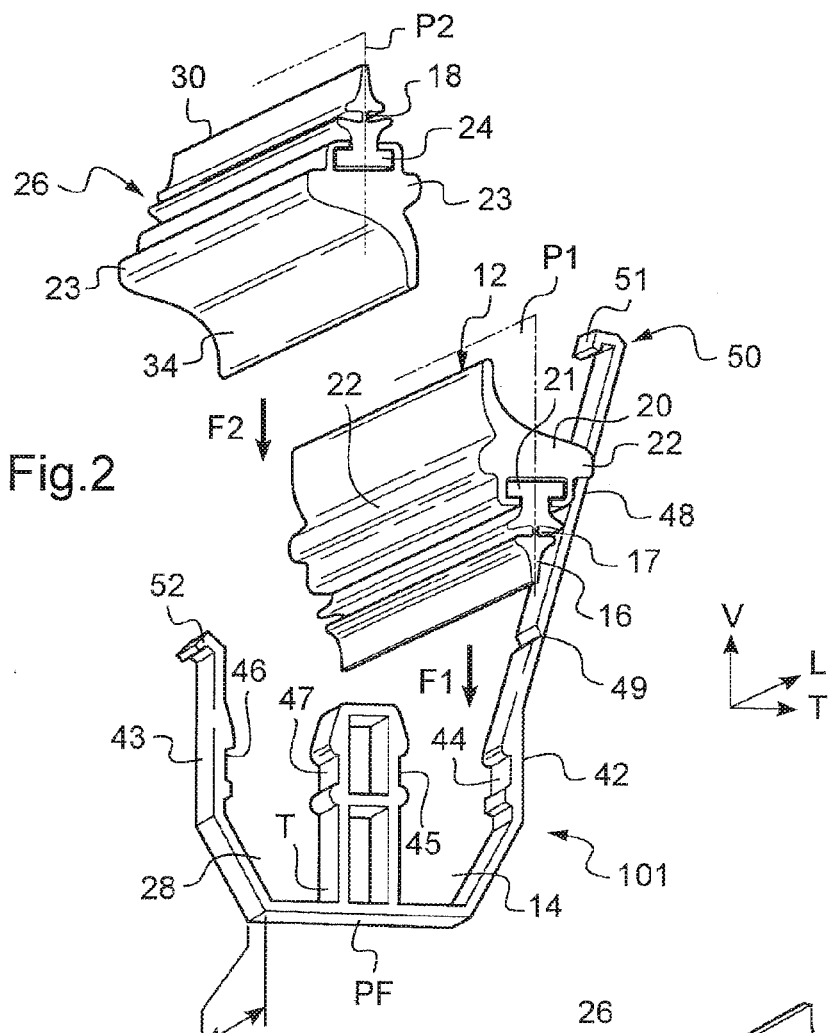
Figure 3:
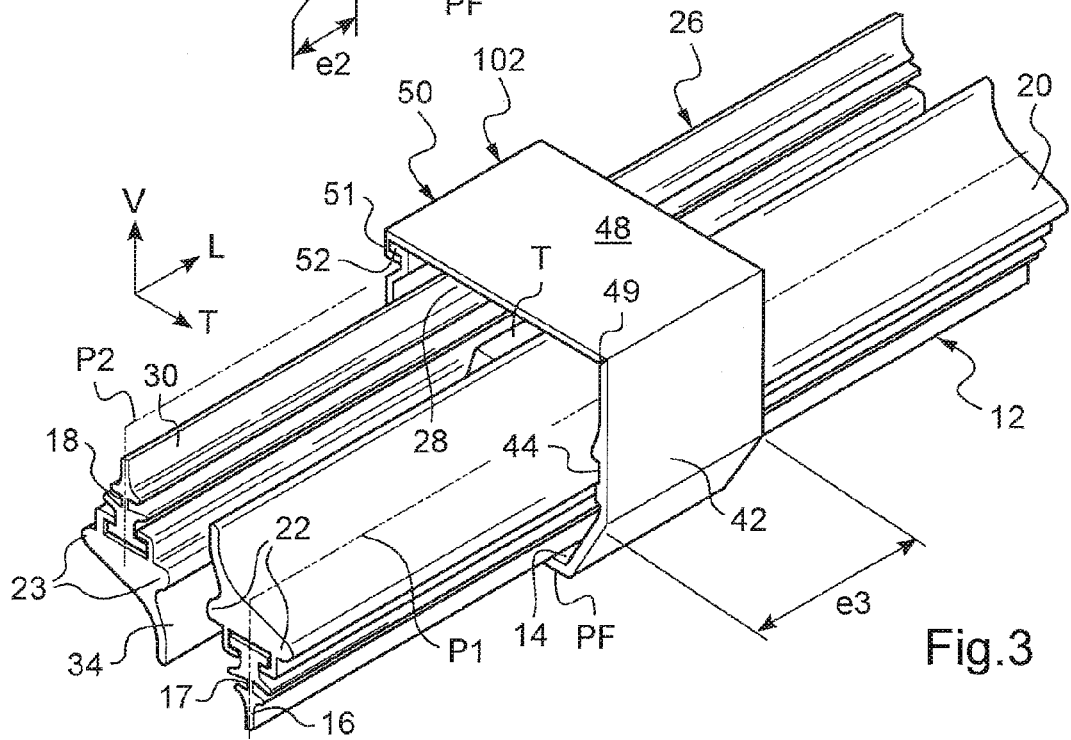
Figure 4:
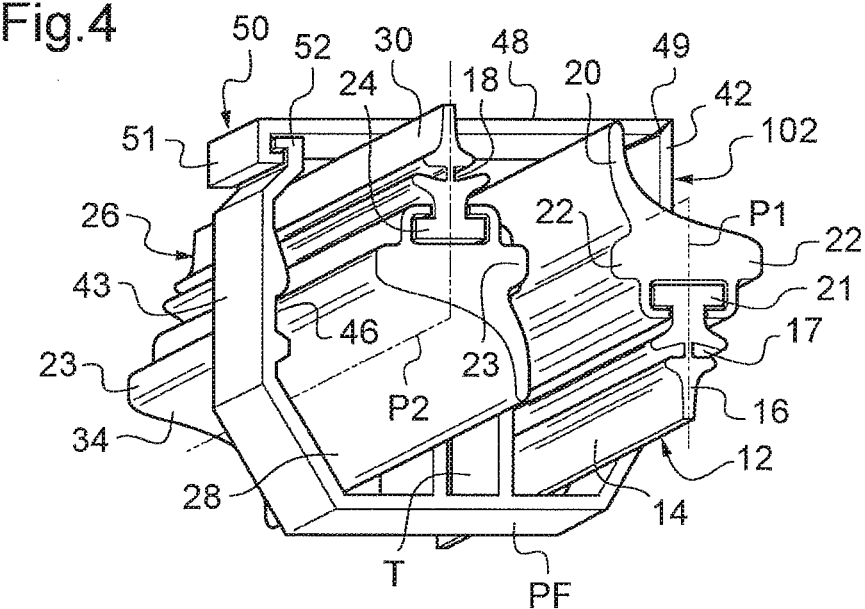
Figure 5:
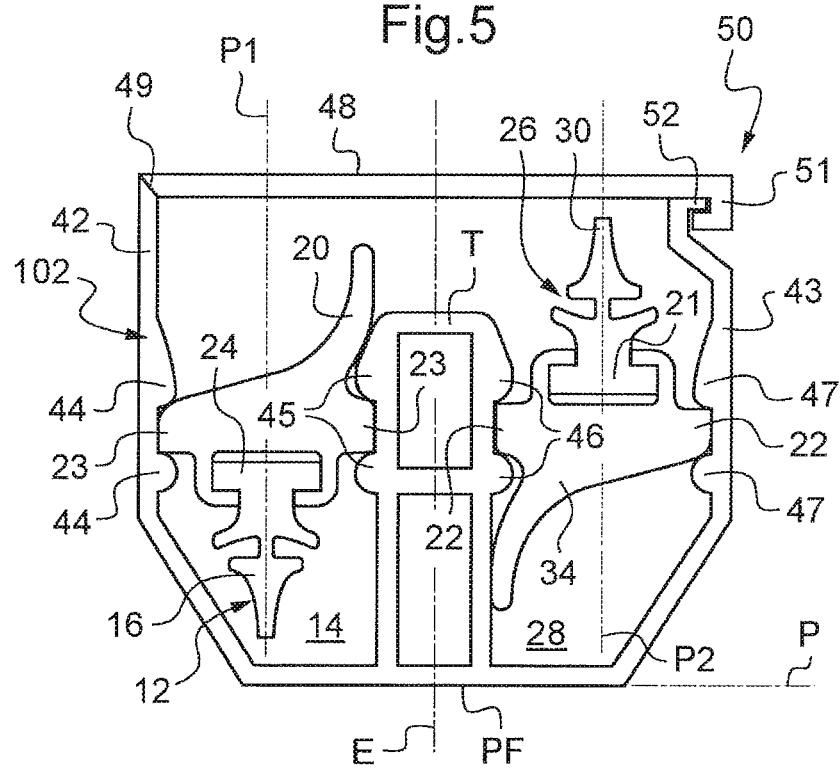

Other features and advantages of the invention will emerge from the following description given by way of nonlimiting example with reference to the appended drawings, in which:

FIG. 1 represents a perspective view from the side of portions of two windshield wipers in the process of being mounted in a first embodiment of a supporting device, FIG. 2 represents a view substantially from the front of portions of two windshield wipers in the process of being mounted in a variant of the supporting device, FIG. 3 represents a perspective view from the side of two nested windshield wiper portions in another variant of the supporting device closed by a closure cap, FIG. 4 represents a view corresponding to FIG. 3 as seen substantially from the front, FIG. 5 represents a view in cross section of the windshield wiper portions and the supporting device from FIG. 4 in the nested position turned approximately 180°, FIG. 6a represents a view in cross section of a variant of the supporting device from FIG. 5 with windshield wipers in the process of being mounted, FIG. 6b represents a view similar to FIG. 6a in a nested and closed position, FIG. 7 represents a perspective view substantially from the front of portions of two windshield wipers in the process of being mounted in a fourth variant of the supporting device, FIG. 8 represents a view analogous to FIG. 7 in which the windshield wiper portions are nested in the supporting device, FIG. 9 represents a view corresponding to FIG. 8 as seen substantially from the side, FIG. 10 represents a view in cross section of the windshield wiper portions and the supporting device from FIG. 8, FIG. 11 represents a view in cross section of windshield wiper portions nested in a supporting device of another variant for supporting another embodiment of the windshield wipers, FIG. 12 represents a view in cross section of portions of two windshield wipers in the process of being mounted in a supporting device of a second embodiment, and FIG. 13 represents a view similar to FIG. 12 of windshield wiper portions nested in a variant of the supporting device.

In these figures, identical elements carry the same reference numbers.

In the remainder of the description, there will be adopted by way of nonlimiting example longitudinal, vertical and transverse directions indicated in this figure by the trihedron (L, V, T) that is fixed relative to the supporting device 10. The longitudinal direction L corresponds to the principal direction of the windshield wipers when flat. In the manner in which the supporting device 10 is represented, the horizontal plane corresponds to the plane (L, T). The "up" and "down" orientations are designated with reference to the orientation of the supporting device as shown in FIG. 1.

The supporting device 10 is adapted to receive a pair of windshield wipers, for example of the "flat-blade" type and of curved shape. It includes a part made from a plastic material, for example, by extrusion, injection molding a plastic material or thermoforming, or any other material.

A portion of a first windshield wiper 12 ready to be mounted on the supporting device 10 is represented above the latter, in vertical alignment with an opening of a first recess 14 of the supporting device 10. This first wiper 12 extends longitudinally in the direction L. Its wiper blade 16 is carried by a structural element itself comprising a supporting frame 20.

The supporting frame 20 comprises:
 a deflector of particular aerodynamic shape able to exercise an aileron ("spoiler") function aiming to improve the adhesion of the wiper 12 to the glazed surface,
 a hook-shaped part for retaining the heel 21 of the wiper blade 16,
 lateral edges 22 extending longitudinally, and
 a longitudinal internal recess for an interior vertebra (not visible) of the wiper blade 16.

The supporting frame 20 is made in one piece for example from a material different from that of the wiper blade 16. The first windshield wiper 12 also includes, approximately in the middle, a connector (not represented) intended to enable its connection to a first windshield wiper driving arm generally connected to a motor.

The wiper blade 16 has a longitudinal constriction 17 enabling it to pivot relative to the longitudinal axis L on each change of direction when the first wiper 12 disposed against the glazed surface is actuated by the corresponding windshield wiper arm. It will also be noted that the wiper blade 16 has a wide first edge extending longitudinally in the vicinity of the constriction 17 and a narrow free second edge intended to be in contact with the glazed surface to be wiped. At rest, the wiper blade 16 has a plane P1 of longitudinal symmetry.

A portion of a second windshield wiper 26 ready to be mounted on the supporting device 10 is also represented above the latter, in vertical alignment with an opening of a second recess 28 of the supporting device 10. Like the first wiper 12, this flat-blade type second wiper 26 extends longitudinally in the direction L.

This second wiper 26 extends longitudinally in the direction L. Its wiper blade 30 is carried by a structural element itself comprising a supporting frame 34.

The supporting frame 34 comprises:
 a deflector of particular aerodynamic shape able to exercise an aileron ("spoiler") function aiming to improve the adhesion of the wiper 26 to the glazed surface,
 a hook-shaped part for retaining the heel 24 of the wiper blade 30,
 lateral edges 23 extending longitudinally, and
 a longitudinal internal recess for an interior vertebra (not visible) of the wiper blade 16.

The supporting frame 34 is in one piece for example and made from a material different from that of the wiper blade 30. The second windshield wiper 26 also includes, approximately in the middle, a connector (not represented) intended to enable its connection to a second windshield wiper driving arm. As in the first wiper 12, the wiper blade 30 has a longitudinal constriction 18 enabling it to pivot relative to the longitudinal axis L on each change of direction when the first wiper 12 is actuated by the corresponding windshield wiper arm against the glazed surface. At rest, the wiper blade 30 has a plane P2 of longitudinal symmetry.

The windshield wipers have been represented with no stop device (end-clip) at their ends, but they may be provided with same, of course.

Although the first recess 14 of the supporting device 10 receives the first wiper 12 with the wiper blade 16 oriented downward, in the direction opposite to the upwardly oriented wiper blade 30 of the second wiper 26, it is possible instead to house the first wiper 12 in the first recess with the wiper blade 16 facing up and the second wiper 26 in the second recess with the wiper blade 30 facing down. Reversing the orientations of the first and second wipers balances the forces retaining the wipers in the supporting device(s) for improved holding of curved wipers in a flat position. The respective wiper blades 16, 30 can also be housed the same way round (facing up or down).

To provide good support for the pair of wipers 12, 26, a plurality of independent and possibly identical supporting devices 10 may be provided. Two supporting devices are provided, for example, one at the front end and the other at the rear end (not represented). Three supporting devices may likewise be provided, two close to the ends of the wipers and one close to a central area in which the connectors that connect the wipers to the windshield wiper driving arms are disposed. Four supporting devices may likewise be provided, with two supporting devices situated in a central region intended to receive the connectors of two wipers so that a supporting device is placed on either longitudinal side of these connectors. Depending on the lengths of the wipers, three, four or more supporting devices may be placed on either side of the connectors.

The supporting devices 10 further include means for retaining respective structural elements of the wipers 12, 26. The retaining means function, for example, by elastic nesting, button-holing, gluing, welding or deformation (not represented) and are provided on parallel wall extensions of the first and second recesses 14, 28 so as to support the respective structural element of the wiper to be fixed.

The recesses 14, 28 have an opening leading onto the same side of a supporting plane P to provide for mounting the pair of wipers 12, 26 in the respective retaining means of the recesses 14, 28 by insertion of the wipers 12, 26 from the same side of the supporting plane P.

For example, and as represented in FIG. 1, the supporting plane P is horizontal (i.e. defined by the longitudinal direction L and the transverse direction T), so that the openings of the first and second recesses 14, 28 lead onto the side that is above the horizontal supporting plane P. Furthermore, the supporting device 10 may have a bottom wall PF common to the first and second recesses 14, 28 that is substantially flat and parallel to the supporting plane P. Thus the supporting device 10 may easily be placed flat on an assembly station.

In the first embodiment, variants of which are shown in FIGS. 1 to 11, the supporting device 10, 101, 102, 103 has the general shape of a staple (or elastic attachment) which is U-shaped with a bottom wall PF common to the two recesses 14, 28. The bottom wall PF is extended laterally by two vertical wall extensions 42, 43. Furthermore, a central section T common to the first and second recesses 14, 28 projects perpendicularly from the middle of the bottom wall PF.

The thickness (i.e. the dimension in the longitudinal direction) e1 is for example of the order of 100 millimeters (FIG. 1). It may be narrower, as shown by the supporting device 101 from FIG. 2, which has a thickness e2 of the order of 20 millimeters, or wider as shown by the supporting device 102 from FIG. 3, which has a thickness e3 of the order of 200 millimeters. The thickness of the supporting device is chosen as a function of the length of the windshield wipers and the number of supporting devices in the assembly so as to hold the pair of wipers firmly and in a stable manner.

The common central section T defines a plane E of longitudinal symmetry between the first and second recesses 14, 28. Furthermore, the recesses 14, 28 are arranged side-by-side so that in the nested position of the pair of wipers 12, 26 the respective planes P1, P2 of longitudinal symmetry of the wiper blades 16, 30 are substantially parallel to each other and parallel to the plane E of longitudinal symmetry.

The staple-shaped retaining means of the supporting device 10 are of the elastic nesting type. To this end they include clips produced in one piece with the supporting device 10, for example by extrusion, injection molding of plastic material or thermoforming.

The clips take the form of four pairs of longitudinal elastic bosses 44, 45, 46 and 47, for example, provided on parallel wall extensions of the first and second recesses 14, 28. A first pair of elastic bosses 44 is thus in one piece with the first vertical extension 42 of the first recess 14. A second pair of elastic bosses 45 similar to the first pair 44 is also in one piece with a first wall of the common central section T, the first wall being parallel to the first vertical extension 42. The bosses of the respective pairs of elastic bosses 44, 45 are offset vertically on the first vertical extension 42 and on the first wall of the common central section T and arranged face-to-face so as to delimit two grooves adapted to clip onto a member of the structural element of the first windshield wiper 12 by elastic deformation of the bosses. More specifically, in this example, the pairs of elastic bosses 44, 45 bracket the lateral edges 22 of the structural element of the first windshield wiper 12, which is made for example of plastic material.

In a similar way, a third pair of elastic bosses 46 is in one piece with the second vertical extension 43 of the second recess 28 and a fourth pair of elastic bosses 47, similar to the other pairs of bosses 44, 45 and 46 is in one piece with a second wall of the common central section T parallel to the second vertical extension 43 so as to clip onto the lateral edges 23 of the structural element of the second windshield wiper 26.

Moreover, and as can be seen in FIG. 3, the vertical extensions 42, 43 are longer than the overall height of the wiper blades 16, 30 and the supporting frames 20, 34 of the respective wipers 12, 26 so as to house the latter completely in the first and second recesses 14, 28.

The openings of the recesses 14, 28 may communicate with each other over the common central section T. They may moreover be closed by a common closure cap 48 of the supporting device 10. The common closure cap 48 is defined for example by a longitudinal hinge 49 provided in a vertical wall extension 42 of the first recess 14 to close the openings of the recesses 14, 28 by pivoting of the cap 48 over the latter. The free edge 50 of the cap 48 includes locking means adapted to interengage with complementary locking means 51 on the edge of the vertical wall extension 43 of the second recess 28.

The locking means may interengage through elastic deformation. For example, and as seen more clearly in FIGS. 2 and 4, the free edge 50 includes a first longitudinal hook 51 clipping by elastic deformation onto a complementary second hook 52 on the edge of the vertical wall extension 43 of the second recess 28. In a variant that can be seen in FIG. 11, the longitudinal hinge 49 is provided in a vertical extension 43 of the second recess 28 and the vertical wall extension 42 of the first recess 14 includes complementary locking means 51.

Other embodiments of the locking means may of course be envisaged. For example, the locking means use a buttonhole and complementary opening system between the free edge of the closure cap and the edge of the vertical wall extension of the second recess (not represented). In another example the locking means are not removable: for example the free edge of the closure cap and the edge of the vertical wall extension of the second recess are glued or welded together.

The common closure cap 48 enables the wall extensions 42, 43 of the supporting device 10 to be supported so that they are not deformed after insertion of the wipers 12, 26. Moreover, the closure cap 48 provides a safety feature for the supporting device 10 ensuring that the wipers 12, 26 remain assembled in kit form even if one of the two should become unclipped from its retaining means.

To mount the first windshield wiper 12 in the supporting device 10, 101, 102, 103, the person carrying out the assembly operation exerts pressure on this first windshield wiper 12 in a direction normal to the supporting plane P (arrow F1) and toward the bottom of the first recess 14 of the supporting device or devices 10, 101, 102, 103 (FIGS. 1, 2 and 6a). Thus the person carrying out the assembly operation opposes the action of the retaining means 44, 45 to bring about elastic nesting of the structural element of the first windshield wiper 12.

To mount the second windshield wiper 26 in the supporting device 10, 101, 102, 103, the person carrying out the assembly operation exerts pressure on this second windshield wiper 26 in a direction normal to the supporting plane P (arrow F2), parallel to and in the same direction as the pressure exerted on the first wiper 12 and toward the bottom of the second recess 28 of the supporting device 10, 101, 102, 103. The person carrying out the assembly operation thus opposes the action of the retaining means 46, 47 to bring about elastic nesting of the structural element of the second windshield wiper 26. Of course, the person carrying out the assembly operation could instead mount the second windshield wiper 26 before mounting the first windshield wiper 12.

The first and second wipers 12, 26 are then supported as a pair. The person carrying out the assembly operation then pivots the common closure cap 48 until the locking means 51, 52 interengage. FIGS. 3 to 5 and 6*b* show the assembly comprising the supporting device 10, 101, 102, 103 and the two wipers 12, 26 mounted thereon.

The supporting device 10, 101, 102, 103 or assembly fixes a pair of front wiper blades 12, 26 to be transported and/or put on sale and has an optimum overall size.

Accordingly, the first and second wipers are mounted on the top of the supporting device 10, 101, 102, the latter being closed by clipping of the locking means, which enables time to be saved. Indeed, the person carrying out the assembly operation saves an assembly step in the process of mounting the pair of wipers 12, 26 in the supporting device(s) 10, 101, 102 compared to prior art devices which had to be turned over after fixing a first of the two wipers to fix the second wiper. Moreover, a single assembly step is all that is necessary for closing the two recesses by pivoting the common closure cap 48.

FIGS. 6*a* and 6*b* show a particular section of the supporting device 103 of one variant of the invention. In this variant, the elastic nesting type retaining means are associated with de-nesting means including a spreader lug 53 for spreading the retaining means. The spreader lug 53 may take the form of a wall extension of the common closure cap 48, projecting at right angles to the wall extension forming the first hook 51 of the locking means. To unlock the common closure cap 48 and de-nest the retaining means, the user pulls on the spreader lug 53, which provides something to grip to facilitate disengagement of the first hook 51 from the complementary second hook 52 and to spread apart the wall extensions 42, 43 of the structural elements of the windshield wipers.

FIGS. 7, 8, 9 and 10 show a fourth variant of the supporting device 104. In this variant, the supporting device 104 is m-shaped (it is shown inverted in the figures), the bridges of the m forming rounded bottoms of the recesses 14, 28.

In this variant, the vertical extensions 42, 43 do not surround the wipers 12, 26 and the recesses are not closed by a closure cap.

The S shape of the bottom wall and a thicker supporting device (the thickness depending on the nature of the material) enable the supporting device 104 to be made mechanically stronger.

Moreover, and as before, the staple-shaped retaining means of the supporting device 10 are of the elastic nesting type. They comprise clips 44, 45, 46 and 47 on parallel wall extensions of the first and second recesses 14, 28. The elastic nesting type retaining means are associated with de-nesting means including a spreader lug 39, 40 for spreading the retaining means.

To be more precise, the lateral extensions 42, 43 of the walls of the recesses 14, 28 are extended above the retaining means by a respective spreader lug 39, 40 that is curved outward to facilitate grasping it and to guide insertion of the windshield wiper at the center of its respective recess.

To mount the windshield wipers 12, 26 in the supporting device 103 it suffices for the person carrying out the assembly operation to exert pressure on the windshield wipers 12 in a direction normal to the supporting plane P (arrows F1, F2) and toward the bottom of the recesses 14, 28. Thus mounting and demounting of the wipers is even faster than when using the supporting device 100, 101 or 102 with a closure cap. To de-nest the retaining means, the user pulls on the respective spreader lug 39, 40 to spread apart the wall extensions 42, 43 of the structural elements of the windshield wipers.

In another variant represented in FIG. 11, the first windshield wiper 12 includes two lateral vertebrae 54 made of metal, for example, fixed into two lateral notches extending longitudinally in the supporting frame 20. Moreover, the wiper blade 16 carried by the structural element of the first wiper 12 is in one piece with the supporting frame 20 in this example.

Also, the second windshield wiper 26 includes two lateral vertebrae 55 fixed into the supporting frame 34. To this end the supporting frame 34 includes two longitudinal lateral notches adapted to receive the two lateral vertebrae 55. The wiper blade 30 is likewise in one piece with the supporting frame 34.

In this variant, the clips of the elastic nesting type retaining means comprise four longitudinal elastic grooves 56, 57, 58, 59 disposed face-to-face on parallel wall extensions of the first and second recesses 14, 28, respectively, for clipping a member of the structural element of the corresponding windshield wiper. Thus there are a first elastic groove 56 in a first vertical wall extension 42 of the first recess 14 and a second elastic groove 57 in a first wall of the common central section T for clipping the lateral vertebrae 54 of the structural element of the first windshield wiper 12 by elastic deformation of the grooves 56, 57.

In a similar manner, there are a third elastic groove 59 in the second vertical wall extension 43 of the second recess 28 and a fourth elastic groove 58 in the second wall of the common central section T to clip the lateral vertebrae 55 of the structural element of the second windshield wiper 26.

The grooves 56, 57, 58, 59 may lie between pairs of longitudinal bosses to make the extensions of the walls of the recesses mechanically stronger.

To mount the first windshield wiper 12 in the supporting device 105, the person carrying out the assembly operation exerts pressure on this first windshield wiper 12 in a direction normal to the supporting plane P and toward the bottom of the first recess 14 of the supporting device(s) 105. The person carrying out the assembly operation thus opposes the action of the retaining means 56, 57 to bring about elastic nesting of the lateral vertebrae 54 of the first windshield wiper 12.

To mount the second windshield wiper 26 in the supporting device 105, the person carrying out the assembly operation exerts pressure on this second windshield wiper 26 in the same direction as the pressure exerted on the first wiper 12, i.e. in a parallel direction normal to the supporting plane P and toward the bottom of the second recess 28 of the supporting device 105. Thus the person carrying out the assembly operation opposes the action of the retaining means 58, 59 to bring about elastic nesting of the lateral vertebrae 55 of the second windshield wiper 26. The person carrying out the assembly operation could of course mount the second windshield wiper 26 before mounting the first windshield wiper 12. The first and second wipers 12, 26 are then supported as a pair. The person carrying out the assembly operation then causes the common closure cap 48 to pivot until the locking means interengage.

The supporting device can thus be common to all types of windshield wiper.

In a second embodiment shown in FIGS. 12 and 13, the supporting device 200 has a central wall 60 common to first and second recesses 14, 28 defining a plane E of longitudinal symmetry of the supporting device 200. In this second embodiment, the recesses 14, 28 are disposed side-by-side so that in the nested position of the pair of wipers 12, 26 the respective planes P1, P2 of longitudinal symmetry of the wiper blades 16, 30 form an angle less than 180°. For example, and as represented in FIGS. 12 and 13, the respective planes P1, P2 of longitudinal symmetry of the wiper blades 16, 30 form an angle α of the order of 90°.

To this end, the recesses 14, 28 have for example a flat bottom wall PF parallel to the supporting plane P, common to the first and second recesses 14, 28 and from which the common central wall 60 projects perpendicularly. This common central wall 60 then splits into two first inclined planes 61, 62, one extending off to the right and the other to the left in FIG. 8. The two first inclined planes 61, 62 are mutually perpendicular and may be joined together by a transverse reinforcing plate 63. Moreover, the recesses 14, 28 have respective second inclined planes 64, 65 parallel to the first inclined planes 61, 62, respectively, so that the recesses 14, 28 lead onto (or have respective closable openings on) the upper side of the supporting plane P.

Moreover, the supporting device 200 includes two closure caps 66, 67 for the first and second recesses 14, 28. The first closure cap 66 for the first recess 14 is defined by a first hinge 49 provided in a wall extension of a first inclined plane 61 of the first recess 14 and the complementary locking means 51 are on an edge of a second inclined plane 64 of the first recess 14. Similarly, the second closure cap 67 of the second recess 28 is defined by a second hinge 49 provided in a wall extension of a first inclined plane 62 of the second recess 28 and the complementary locking means 51 are on an edge of a second inclined plane 65 of the second recess 28. As before, the locking means of the closure caps 66, 67 may interengage by elastic deformation, button-holing, gluing or welding.

Moreover, as in the first embodiment, the recesses 14, 28 are provided with means for retaining the respective structural elements of the two wipers. These retaining means may equally be of the elastic nesting type.

The supporting device 201 from FIG. 13 differs from that from FIG. 12 in that the elastic nesting type retaining means are associated with de-nesting means including first and second spreader lugs 68, 69 for spreading the retaining means. The first spreader lug 68 is formed by a wall extension of the first closure cap 66 and the second spreader lug 69 is formed by a wall extension of the second closure cap 69.

To mount the first windshield wiper 12 in the supporting device 200, 201 the person carrying out the assembly operation exerts pressure on this first windshield wiper 12 from the upper side of the supporting plane P and in a first inclined insertion direction (arrow F1 in FIG. 12) toward the bottom of the first recess 14 of the supporting device(s) 200, 201. The person carrying out the assembly operation thus opposes the action of the retaining means 44, 45 to bring about elastic nesting of the lateral edges 22 of the first windshield wiper 12. Once the first wiper 12 has been fixed to the supporting device 200, 201, the person carrying out the assembly operation pivots the first closure cap 66 over the opening of the first recess 14 until the locking means 51, 52 interengage.

To mount the second windshield wiper 26 in the supporting device 200, 201 the person carrying out the assembly operation exerts pressure on this second windshield wiper 26 from the same upper side of the supporting plane P as the first insertion direction F1 of the first wiper 12 and in a second inclined direction (arrow F2 in FIG. 8) toward the bottom of the second recess 28 of the supporting device(s) 200, 201. The person carrying out the assembly operation thus opposes the action of the retaining means 46, 47 to bring about elastic nesting of the lateral edges 23 of the second windshield wiper 26. The person carrying out the assembly operation then causes the second closure cap 67 to pivot over the opening of the second recess 28 until the locking means 51, 52 interengage.

The person carrying out the assembly operation can of course mount the second windshield wiper 26 before mounting the first windshield wiper 12.

To unlock the first closure cap 66 and de-nest the retaining means of the first recess 14, the user pulls on the first spreader lug 68. Similarly, to unlock the second closure cap 67 and de-nest the retaining means of the second recess 28, the user pulls on the second spreader lug 69.

Although the mounting device 200, 201 of the second embodiment has been described for windshield wipers with molded-in vertebrae, this mounting device 200, 201 is equally suitable for other types of windshield wiper, such as that represented in FIG. 11.

The invention claimed is:

1. A supporting device, comprising:
a pair of windshield wipers having at least a first wiper and a second wiper which the supporting device supports, each of the first and second wipers comprising at least a structural element and a wiper blade;
first and second recesses, each of which is provided with retaining means for retaining the first wiper and the second wiper, the recesses having an opening leading onto a same side of a supporting plane in order to enable insertion of the pair of windshield wipers into the respective recesses from the same side of the supporting plane;
a bottom wall common to the first and second recesses; and
wherein the bottom wall is flat and parallel to the supporting plane, and
wherein the first and second wipers are disposed side-by-side in opposing directions with respect to the bottom wall in a configuration selected from the group consisting of:
the wiper blade of the first wiper being oriented downwardly and the wiper blade of the second wiper being oriented upwardly, or
the wiper blade of the first wiper being oriented upwardly and the wiper blade of the second wiper being oriented downwardly.

2. The supporting device as claimed in claim 1, wherein the retaining means are of an elastic nesting type.

3. The supporting device as claimed in claim 2, wherein the retaining means of the elastic nesting type include first and second pairs of elastic bosses arranged longitudinally in the respective recess to clip a member of a structural element of the corresponding windshield wiper.

4. The supporting device as claimed in claim 2, wherein the retaining means of the elastic nesting type include first and second elastic grooves arranged longitudinally in the respective recess to clip a member of a structural element of the corresponding windshield wiper.

5. The supporting device as claimed in claim 1, further comprising at least one closure cap for closing the first and second recesses, the closure cap being defined by a hinge provided in an extension of wall of recess and one edge of the closure cap including locking means adapted to interengage with complementary locking means on an edge of an extension of wall of recess.

6. The supporting device as claimed in claim 5, wherein the locking means interengage by elastic deformation.

7. The supporting device as claimed in claim 1, wherein the device is generally m-shaped.

8. The supporting device as claimed in claim 2, wherein the device comprises a plane of longitudinal symmetry between the first and second recesses and wherein said recesses are arranged side-by-side so that in nested position of the pair of windshield wipers the respective planes of longitudinal symmetry of the wiper blades are substantially parallel to each other and parallel to the plane of longitudinal symmetry.

9. The supporting device as claimed in claim 8, wherein the device is generally staple-shaped.

10. The supporting device as claimed in claim 8, wherein the device further comprises a closure cap common to the first and second recesses.

11. A supporting device, comprising:
a pair of windshield wipers having at least a first wiper and a second wiper which the supporting device supports, each of the first and second wipers comprising at least a structural element and a wiper blade;
first and second recesses, each of which is provided with retaining means for retaining the first wiper and the second wiper, the recesses having an opening leading onto a same side of a supporting plane in order to enable insertion of the pair of windshield wipers into the respective recesses from the same side of the supporting plane; and
wherein a biasing force of the first wiper offsets a biasing force of the second wiper, and
wherein the first and second wipers are disposed side-by-side in opposing directions perpendicular to a plane of longitudinal symmetry of the supporting plane in a configuration selected from the group consisting of:
the wiper blade of the first wiper being oriented downwardly and the wiper blade of the second wiper being oriented upwardly, or
the wiper blade of the first wiper being oriented upwardly and the wiper blade of the second wiper being oriented downwardly.

* * * * *